United States Patent [19]

Kawamura

[11] Patent Number: 5,638,464
[45] Date of Patent: Jun. 10, 1997

[54] IMAGE PROCESSING APPARATUS

[75] Inventor: Naoto Kawamura, Yokohama, Japan

[73] Assignee: Canon Kabushiki Kaisha, Tokyo, Japan

[21] Appl. No.: 272,371

[22] Filed: Jul. 6, 1994

Related U.S. Application Data

[63] Continuation of Ser. No. 165,866, Dec. 14, 1993, abandoned, which is a continuation of Ser. No. 769,768, Oct. 4, 1991, abandoned, which is a continuation of Ser. No. 554,965, Jul. 20, 1990, abandoned, which is a continuation of Ser. No. 237,165, Aug. 29, 1988, abandoned.

[30] Foreign Application Priority Data

Sep. 2, 1987 [JP] Japan .................... 62-217991

[51] Int. Cl.$^6$ .................................. G06K 9/36
[52] U.S. Cl. .................................. 382/232; 382/235
[58] Field of Search .................. 382/44, 45, 48, 382/46, 56, 235, 296, 297, 293, 295, 232, 248, 309; 358/451, 452, 453, 433; 348/420; 395/133

[56] References Cited

U.S. PATENT DOCUMENTS

| | | | |
|---|---|---|---|
| 3,976,982 | 8/1976 | Eiselen | 382/44 |
| 4,439,783 | 3/1984 | Nishikawa | 358/183 |
| 4,631,751 | 12/1986 | Anderson et al. | 382/46 |
| 4,638,368 | 1/1987 | Shimizu | 358/256 |
| 4,641,197 | 2/1987 | Miyagi | 358/280 |
| 4,672,459 | 6/1987 | Kudo | 358/280 |
| 4,675,725 | 6/1987 | Parkyn | 358/183 |
| 4,750,212 | 6/1988 | Yokomizo | 382/48 |
| 4,797,945 | 1/1989 | Suzuki et al. | 382/56 |

FOREIGN PATENT DOCUMENTS 62-140175  6/1987  Japan .

*Primary Examiner*—Yon J. Couso
*Attorney, Agent, or Firm*—Fitzpatrick, Cella, Harper & Scinto

[57] ABSTRACT

There is disclosed an image processing apparatus having a memory for storing encoded data obtained by dividing an image into blocks of a predetermined size. Image data of each block is encoded, and a reader is provided for selectively reading encoded data, corresponding to an arbitrary block, from the memory. A decoder decodes the encoded data read out from the memory, and a processor is provided for editing for each block of the image data decoded by the decoder.

25 Claims, 5 Drawing Sheets

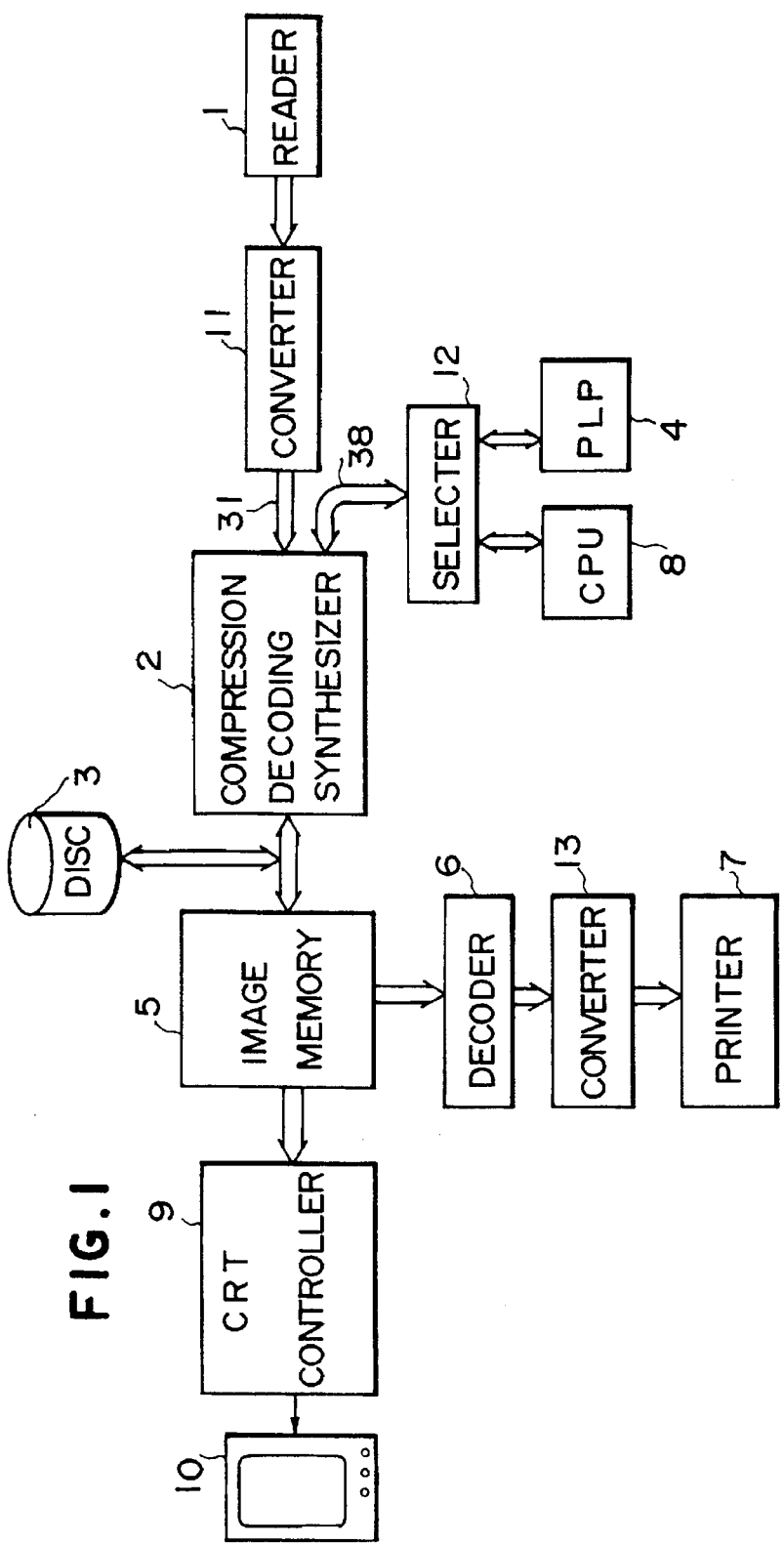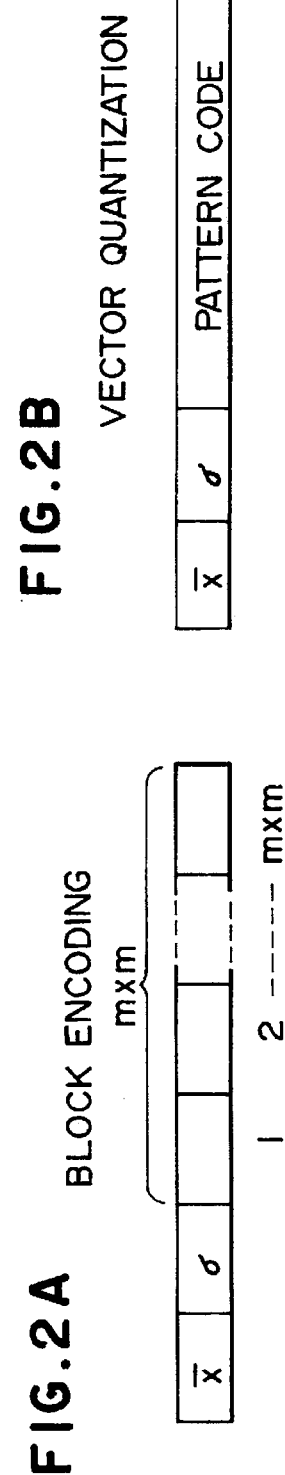

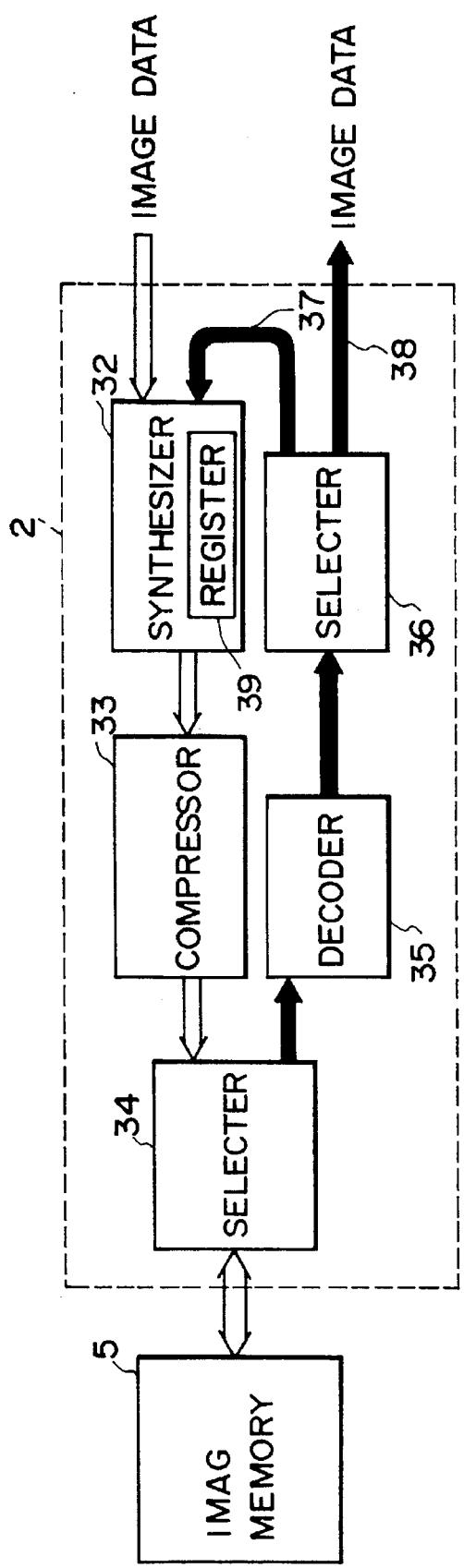
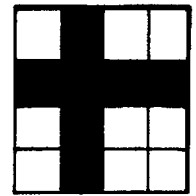
FIG.5C
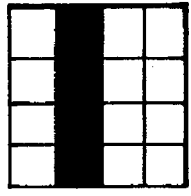
FIG.5B
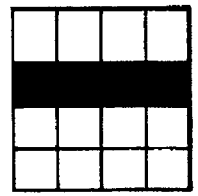
FIG.5A

ND1,638,464

IMAGE PROCESSING APPARATUS

This application is a continuation, of application Ser. No. 08/165,866 filed Dec. 14, 1993, now abandoned, which is a continuation of application Ser. No. 07/769,768 filed Oct. 4, 1991, now abandoned, which is a continuation of application Ser. No. 07/554,965 filed Jul. 20, 1990, now abandoned, which is a continuation of application Ser. No. 07/237,165 filed Aug. 29, 1988, now abandoned.

BACKGROUND OF THE INVENTION

1. Field of the Invention

The present invention relates to an apparatus for processing image data, and more particularly to an image processing apparatus for editing compression encoded image data.

2. Related Background Art

There have already been proposed an apparatus for executing various image editings such as partial extraction of the original image, image enlargement, image reduction and synthesis, character or other information with the original image, by converting the original image information into electrical image data and applying electrical processes to the image data.

In such and apparatus, a compression process is often applied to the image data in order to improve the efficiency of transmission or storage, since the amount of image data becomes enormous when an image with tonal rendition or a color image is involved.

However the above-mentioned editing processes are executed only after complete decoding of such compressed image data.

The decoding of the compressed image data and the handling of the decoded image data of enormous amount requires larger equipment and a longer processing time.

Also the synthesis of plural images of different image formats is made after the format of at least an image is converted to that of the other image. Therefore the format conversion of an entire image requires a long period, and an image memory of a large capacity is required for storing the entire image after format conversion.

SUMMARY OF THE INVENTION

In consideration of the foregoing, an object of the present invention is to provide an image processing apparatus capable of high-speed image editing of encoded image data with a simple structure.

Another object of the present invention is to provide an image processing apparatus capable of efficiently synthesizing encoded image data with other image data.

Still another object of the present invention is to provide an image processing apparatus suitable for image data of a large data amount, such as data of a color image or an image with tonal rendition.

Still another object of the present invention is to provide an image processing apparatus suitable for editing process on block encoded image data.

The foregoing and still other objects of the present invention, and the advantages thereof, will become fully apparent from the following description.

BRIEF DESCRIPTION OF THE DRAWINGS

FIG. 1 is a block diagram of an image processing apparatus embodying the present invention;

FIGS. 2A and 2B are views showing examples of encoding;

FIG. 4 is a block diagram of compressor, decoder and synthesizer of said embodiment;

FIGS. 5A to 5C are views showing an example of pixels to be subjected to overwriting;

DETAILED DESCRIPTION OF THE PREFERRED EMBODIMENTS

Figure 3A:
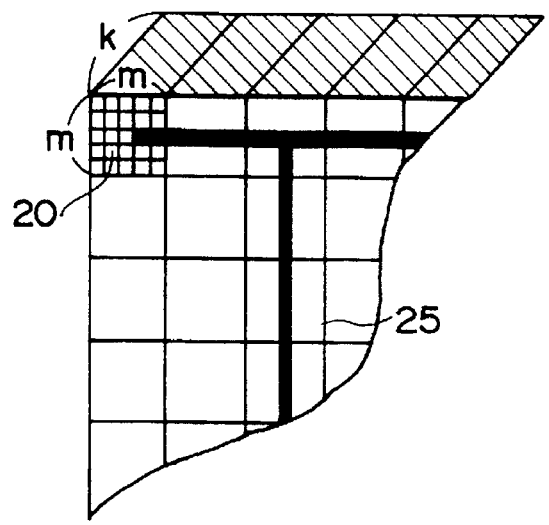
FIGS. 3A to 3C are views showing an example of overwriting of compressed image data.

In the following the present invention will be clarified in greater detail by preferred embodiments thereof.

The editing functions of an image editing apparatus can be classified into:

(1) high-speed processing by a hardware circuit; and (2) software processing by a CPU.

The former is executed by a hardware, for example a pipeline processor, and is used for processes particularly requiring high speed. The latter is used for the processes which are conducted on interactive basis with the user and for which a certain processing time is tolerable.

More specifically, the process with the pipeline processor is principally used in successive processing of image such as affin conversions for determining image layout (enlargement, reduction, translation and rotation), spatial filtering (image emphasis and smoothing), or color conversion with a look-up table.

On the other hand, the latter software process with the CPU is principally used for complex processes or those which are not easily realizable with hardware, such as extraction of an arbitrary portion of the image, movement of thus extracted partial image to another location, and correction of a part of the image. These processes are generally dependent on the creativity of the operator, and can tolerate a certain processing time, but need to be highly sophisticated.

The system architecture itself of the editing the apparatus has to be designed carefully, in order to execute these two editing functions. More specifically, in order to execute these two processes at high speed with a sufficiently sophisticated level, it is necessary to consider the structure of the system, format of the image data to be processed, flow of the signals and nature of the desired functions.

Various investigations have lead to the following system architecture for the color image editing apparatus:

(1) For image editing, the image data are stored in a memory in the form of compressed data;

(2) For compression, block encoding is preferred in which a code is defined for each block of m×n pixels, or vector encoding; and (3) For graphic output of fine quality, the image data within a block of m×n pixels have to be rewritten.

With respect to (1), in order to achieve image editing with a high resolving power and a high tonal image quality, an enormous quantity of image data date is required. For example, in case of color reading of a page of A4 size with a resolving power of 16 pixels/mm in which each pixel is represented by 8 bits, there is required a capacity for data of about 4.8 Mbyte for three colors of red, green and blue. For achieving the above-mentioned image editing processes in interactive and sophisticated manner, it is important to compress the color image data into an easily editable form. It is concluded, in (2), that block encoding or vector digitizing is suitable for this purpose.

Such methods, in which m×n pixels of the image are converted into a code of a fixed length, are advantageous in obtaining a large compression rate and conserving the positional information of the image data.

The present inventors have noticed, in making a graphic image of a high resolving power with the image data compressed as explained above, that even the image data in each block of m×n pixels have to be rewritten in the image editing, as indicated in (3). More specifically, in case of preparing graphic data on image represented by a group of code data which are compressed in the unit of m×n pixels by vector digitizing, it is necessary to modify the code values of the underlying image.

The present invention enables editing of such compressed image data with a high resolving power and with a simple hardware.

In the following the present invention will be clarified in greater detail by a preferred embodiment thereof shown in the attached drawings. Explanation of Image Processing Apparatus (FIG. 1)

FIG. 1 is a block diagram of an image editing apparatus embodying the present invention.

Image data (for example digital data of 8 bits for each of red, green and blue colors) obtained by reading a color image with a reader 1, which photoelectrically reads the color image with color separation, are converted by a converter 11 into a luminance signal (Y) and color difference signals (I, Q) used in the NTSC signal system, according to the following conversion equation:

$$\begin{pmatrix} Y \\ I \\ Q \end{pmatrix} = \begin{pmatrix} 0.3 & 0.59 & 0.11 \\ 0.6 & -0.28 & -0.32 \\ 0.21 & -0.52 & 0.31 \end{pmatrix} \cdot \begin{pmatrix} R \\ G \\ B \end{pmatrix}$$

The coefficients of the conversion matrix can be suitably modified according to the color separation characteristics and gamma characteristics of the reader 1. The obtained signals Y, I, Q are compressed by a compression-decoding-synthesizer 2 to be explained later, and are stored in a disk memory 3 constituting an image data file. The image data stored in the disk 3 are then released to an IC memory, called image memory 5, and are subjected to processing and editing.

The image data on the image memory 5 are subjected to various editing by a software process in a CPU 8 and a hardware process utilizing a pipeline processor 4. The state of the editing is displayed, through a CRT controller 9, on a color display unit 10, thereby enabling the operator to monitor the state of processing. The data edited in the image memory are decoded by a decoder 6 into the original image data, then converted in a converter 13 into color signals, for example of yellow (Y), magenta (M), cyan (C) and black (Bk) corresponding to a color printer 7 utilizing three primary colors, and supplied to said printer 7 for reproducing the color image.

In the following there will be explained the method of image data compression.

It is already known that the visual image quality is not significantly deteriorated by dividing the color image data into the luminance signal and color difference signals such as Y, I, Q and by sufficiently preserving the spatial frequency of the luminance signal Y, even if the spatial frequency of the color difference signals I, Q is sacrificed to a certain extent by the omission of the high frequency components (Color Science Handbook; edited by Japan Color Science Society).

There is therefore adopted a method of data compression in which the amount of color image data is reduced by representing the signals I, Q with average values in the block of m×n pixels (m being an integer). The block size for the signals I, Q is selected for example as 2×2, 4×4 or 6×6 according to the required image quality and the available memory capacity. As an example, in case of a block size of 4×4 pixels, the above-mentioned memory capacity of 48 Mbyte required for one page is reduced to 16 Mbyte (for non-compressed Y)+2 Mbyte (I, Q)=18 Mbyte, with a compression rate of ca. 1/2.7.

On the other hand, the signal Y different from the signals I and Q, requires a method of compression that can satisfactorily conserve the data of resolution.

A first method capable of such compression is block encoding.

In this method, the average $\bar{x}$ and standard deviation $\sigma$ of the pixel data x in the m×m block are calculated. Then the density information of each pixel is represented by several bits, for example by calculating $(x-\bar{x})/\sigma$ for each pixel and redigitizing the obtained result, wherein x is the density data of each pixel. FIG. 2A shows the format of such compressed data, in which the average and standard deviation are followed by m×m density information of pixels, and the order of said density information has one-to-one correspondence with the pixel positions in the block.

A second method capable of such compression is vector digitizing of m×m pixels.

In an example of this method, the data compression is achieved in each block, by representing the pixel data in the m×m block by means of the average value $\bar{x}$ and standard deviation $\sigma$ of all pixels and a code representing the image pattern in the block. FIG. 2B shows an example of the format of thus compressed data.

In the foregoing examples the signal Y alone is represented by data involving resolution while the signals I, Q are represented by the average data in the m×m block, but it is also possible to encode the signals I, Q in a format same as that for the signal Y.

In such compression, an image of N×N pixels is divided into blocks of m×m pixels each and the block of m×m pixels is converted into a code of a fixed length of k bits. Consequently the memory for storing thus compressed image data has a structure with an address space of N/m×N/m with a depth of k bits. Therefore, such compressing method conserves the address information of the image, and shows improved random access ability, such as search or writing of image at an arbitrary position and is more suited for editing operations, in comparison with the ordinary compressions with variable code length such as MH, MMH, MR or MMR encoding.

In case of designing or overwriting graphic data based on the compressed data explained above, it becomes possible to rewrite the compressed data themselves.

Figure 3C:
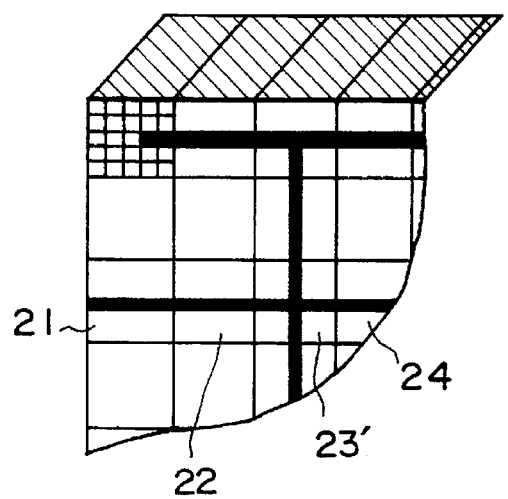
Figure 3B:
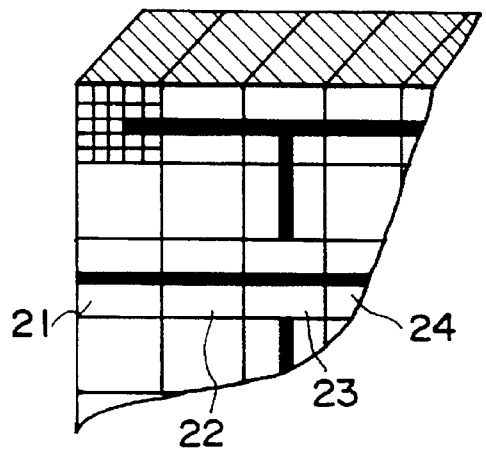

FIGS. 3A to 3C illustrate such situation, and FIG. 3A shows an image represented by image data compressed for each block, wherein 20 indicates a unit block of m×m pixels for image data compression. In this example the image data contained in the block 20 of m×m pixels are converted into a code.

FIG. 3B shows the result of synthesis of another image with the image shown in FIG. 3A, in which the image blocks 21–24 are subjected to overwriting, so that, in the image block 23 of the crossing portion, the vertical line in the underlying image shown in FIG. 3A disappears.

In order to avoid such phenomenon, it is necessary to decode the compressed data of the image block 25 in FIG. 3A to obtain the original image data, then to synthesize said image data, pixel by pixel, with the image data of the block 23 to be synthesized thereby obtaining image data corresponding to the image block 23', and to again compress thus obtained data, as shown in FIG. 3C.

In this manner the synthesis of high fidelity requires the steps of decoding of compressed data, synthesis and compression encoding, and the present embodiment is to enable the above-mentioned process in an easy manner. Explanation Of Compression/Decoding/Synthesizer (FIGS. 4 to 7)

FIG. 4 is a block diagram of the compression/ decoding/ synthesizer 2 used in the image processing apparatus shown in FIG. 1.

The non-compressed image data 31 entered from the reader 1, for reading a color image line by line, through the converter 11 are supplied in the order of raster into a synthesizer 32. The synthesizer 32 has a group of m×m registers 39, each of which is capable of storing plural bits (h bits) required for representing the density of each pixel. A compressor 33 receives m×m data stored in the registers 39 of the synthesizer 32, compresses said m×m data in the unit of a block, and releases a compressed code, which is for example a vector digitized code shown in FIG. 2B. The compressed code is transmitted through a selector 34, and is stored in the image memory 5 at an address designated by the CPU 8. The addresses positionally correspond to the unit blocks of the color image read by the reader 1, so that the compressed data can be read corresponding to any image block by address designation At the output of image data from the image memory 5, the compressed code is read in response to a readout address supplied from the CPU 8. The compressed code thus read is supplied, through a selector 34 to a decoder 35, which decodes the compressed code into the original image data of m×m pixels. The image data are released as image data 38 through the selector 36.

In the following there will be explained overwriting of other image data on background data. The image data read from the image memory through the selector 34 are decoded in the decoder 35, and the selector 36 supplies the synthesizer 32 with the decoded image data of m×m pixels. Said synthesizer 32 synthesizes other image data 31 entered from the reader 1 with the decoded image data 37 supplied from the selector 36 on the registers 39, and releases the obtained data to the compressor 33. The image data synthesis is achieved by matching the addresses in the block of m×m pixels.

The method of synthesis can be represented by:

C=A+B wherein A is input image data 31; B is decoded image data; and C is synthesized image data. Such calculation is conducted for each pixel in the block, by means of the synthesizer 32. If the image data are multi-level data indicating intermediate density, the calculation is conducted by simple addition. If the image data are binary data indicating characters or linetone images, the calculation is conducted by taking logic sum of binary data. The synthesized image data of m×m pixels are supplied to the compressor 33 for data compression in the unit of block, and the compressed data are stored, through the selector 34, in a designated address of the image memory 5. The address is same as the readout address of the compressed data from the image memory 5.

FIGS. 5A to 5C show the mode of overwriting. For the purpose of simplicity, there is illustrated the synthesis in the image block 23 shown in FIG. 3, taking an example of a block of 4×4 pixels and of a binary (black and white) image. FIG. 5A shows image data decoded from the compressed code of the background image block 25 shown in FIG. 3A, and said image data are at first written into the registers 39, which have a corresponding structure of 4×4. FIG. 5B shows image data to be overwritten, corresponding to the image block 23 in FIG. 3B, and said image data are written into the registers 39 which already store the image data shown in FIG. 5A. FIG. 5C shows the image data (image block 23' in FIG. 5C) immediately after the synthesis in the registers 39 of the synthesizer 32. The image data shown in FIG. 5C are then supplied to the compressor 33, and a new compressed code is registered in the image memory 5, at a position where the compressed code for the image block 25 was stored.

Figure 6:
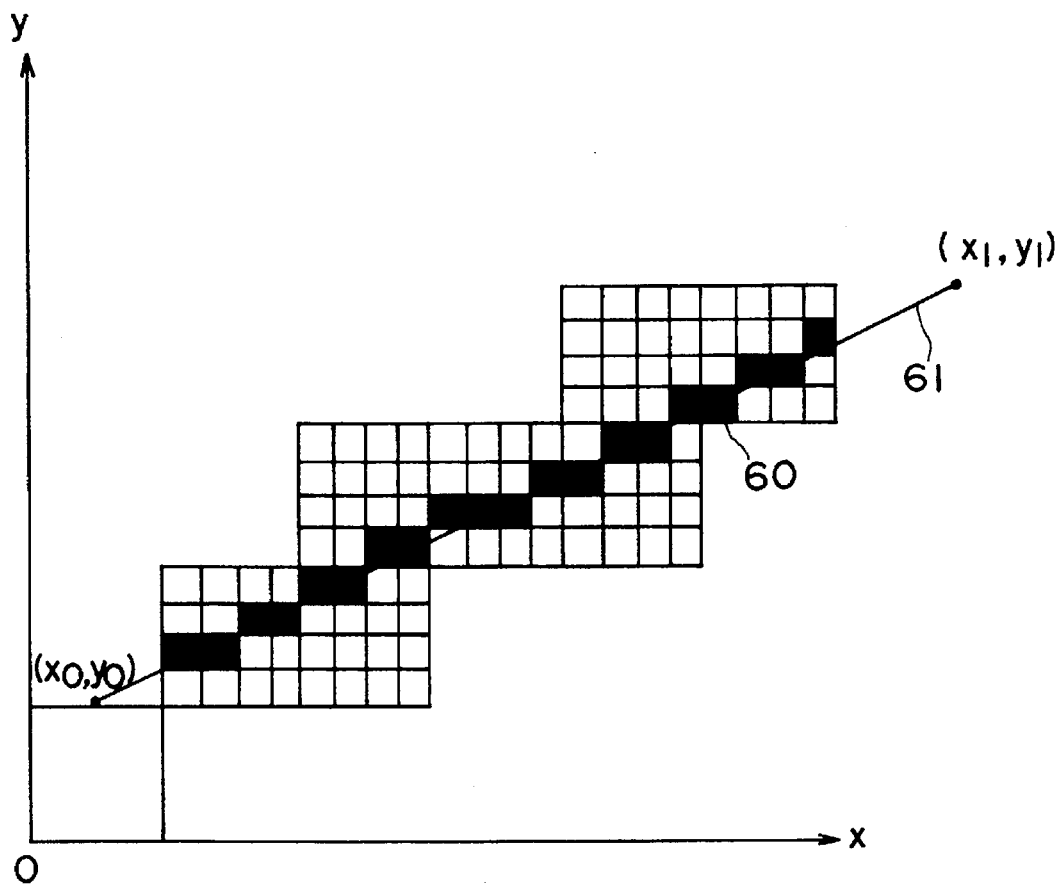
FIG. 6 is a view showing the method of mapping of vector data into an image memory.

FIG. 6 shows the method of mapping of vector data 60 into the image memory 5.

In the following there will be considered an image space with an x-y coordinate system, of which unit is composed of the pixel of vector data 60 before compression, and the compression is conducted in a unit block same as in the above-explained image data compression. In the following there will be considered a case of writing a vector between two points $(x_0, y_0)$ and $(x_1, y_1)$ into the image memory 5.

Figure 8:
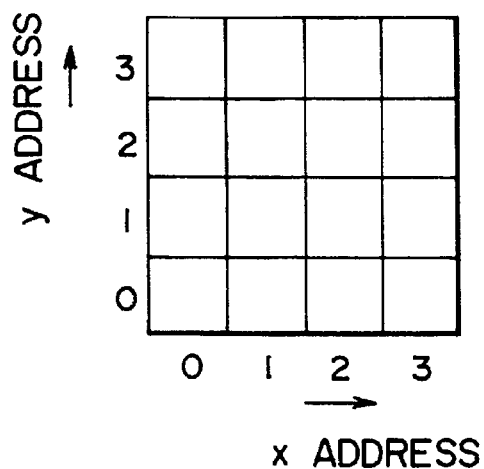
FIG. 8 is a view of address structure of a register.
Figure 7:
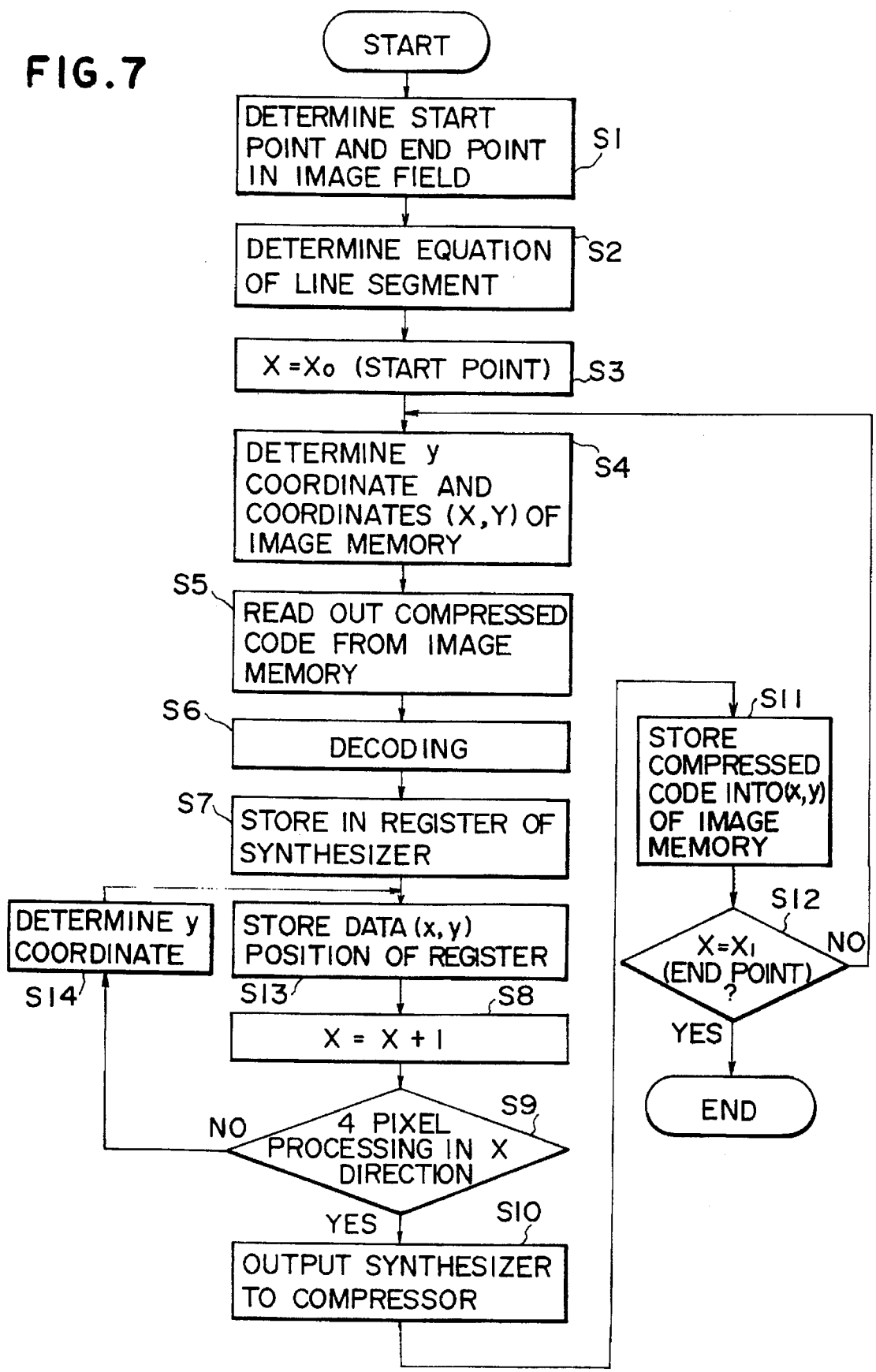
FIG. 7 is a flow chart of a process for overwriting into an image memory.

FIG. 7 is a flow chart showing a sequence of overwriting an image represented by vector data into the image memory 5, and FIG. 8 shows the address structure of the m×m (4×4 in this case) registers 39 in the synthesizer 32.

A step S1 determines the start point and the end point of vector data (graphic data) in the image space, for example corresponding to the points $(x_0, y_0)$ and $(x_1, y_1)$ in FIG. 6. Then a step S2 determines the equation representing the line 61, which is:

$$y = \frac{y_1 - y_0}{x_1 - x_0}(x - x_0) + y_0$$

A step S3 sets x as the start point, and a step S4 determines the value of y corresponding to x, and also determines the coordinates (X, Y) of an image block, containing the coordinates (x, y) and composed of m×m (4×4 in this case) pixels. The coordinates (X, Y) correspond to the address of the image memory 5. Said values X, Y can be determined from the following equations:

X=[x/m]

Y=[y/m]

wherein [] the Gaussian symbol.

Based on thus determined address (X, Y), a step S5 reads a compressed code from the image memory 5 and a step S6 decodes it in the decoder 35.

A step S7 the image data, entered is decoded in the decoder 35, into 4×4 registers of the synthesizer 32 through the selector 36.

In step S13 an image is written, represented by vector data, into the registers 39. More specifically data are written in the pixel positions of the registers 39, corresponding to the points (x, y) on the line portion represented by the foregoing equation. It is to be noted that the registers 39 have x-addresses of 0–3 and y-addresses of 0–3 as shown in FIG. 8, so that they are not directly accessible by the (x, y) address represented by the foregoing equation. Consequently the data writing is conducted at an address position (x', y') wherein x'=mod(x, 4) and y'=mod(y, 4).

In this manner the image data represented by vector data are overwritten on the image data of a corresponding unit block, obtained by decoding a compressed code.

Then a step S8 conducts a step increment of the value x, and a step S9 checks if the process has been completed for all the pixels in the unit block. If not completed, a step S14 determines the y coordinate according to the foregoing equation, and a step S13 executes data writing in the position (x, y) of the registers 39.

When the process is completed for all 4×4 pixels, the registers 39 hold image data obtained by synthesis of the image of unit block read from the image memory 5 with the vector data. Then the sequence proceeds to a step S10 to send the image data of 4×4 pixels from the registers 39 of the synthesizer 32 to the compressor 33. The image data are compressed in the compressor 33, and are stored in the address (X, Y) of the image memory 5 determined in the step S4. Then a step S12 checks if the x-coordinate has reached the end point (x=$x_1$), and, if not, the sequence returns to the step S4 to repeat the above-explained process for a next block.

As explained in the foregoing, in case of synthesizing a line image represented by vector data with an image compressed with unit blocks of m×m pixels each, it is not necessary to decode the entire compressed image. The synthesis can be achieved by decoding of the compressed data only in the blocks where the synthesis of the image represented by the vector data takes place.

It is therefore rendered possible to avoid a long time required for decoding the compressed data of the entire image and to eliminate the necessity for a large memory capacity for storing the decoded data of the entire image, thereby achieving high-speed synthesis with a simple structure.

The foregoing embodiment has been limited to the synthesis of a line image represented by vector data with an image compressed in the unit of blocks, but the image to be synthesized can be characters or symbols represented for example by ASCII codes or images represented by page description language.

It is naturally possible also to synthesize images compressed in the block unit, and the compression in block unit may be achieved in various encoding methods other than vector encoding.

As explained in the foregoing, the present embodiment easily enables compression of data of crossing images such as vectors or graphic data, and overwriting of image data on the compressed codes.

It is also rendered possible to achieve correction and editing of enormous image data obtained by reading a color image with a high resolving power after data compression in a form suitable for such editing, and to obtain the resulting image with a high resolving power and a satisfactory tonal rendition.

As explained in the foregoing, there is obtained an advantage of achieving correction and editing after the image data is compressed into a form suitable for such editing.

Though the present invention has been explained by a preferred embodiment thereof, it is not limited to such embodiment and is subjected to various modification within the scope and spirit of the appended claims.

What is claimed is:

1. An image processing apparatus comprising:

memory means for storing encoded data obtained by dividing a first image into a plurality of blocks, each of said plurality of blocks being a predetermined size, and by encoding image data of each of said plurality of blocks;

generating means for generating area data representing an image portion of the first image in which a second image is to be inserted, the image portion being a part of the first image;

supplying means for supplying code data corresponding to the second image to be synthesized with the first image;

developing means for developing the code data into image data representing the second image;

reading means for obtaining an address corresponding to each of a plurality of blocks included in the image portion of the first image in which the second image is to be inserted, and reading out the encoded data indicated by the thus obtained address from said memory means on a block basis;

decoding means for decoding the encoded data read out from said memory means on a block basis to decoded image data on a block basis;

synthesizer means for synthesizing the decoded image data from said decoding means with the image data of a corresponding block in the second image on a block basis;

encoding means for encoding the image data synthesized by said synthesizer means on a block basis to produce re-encoded data; and writing means for writing the re-encoded data in said memory means, wherein the encoded data which are not read out from said memory means remain in said memory means and, together with the re-encoded data, represent a synthesized image of the first and the second image.

2. An image processing apparatus according to claim 1, wherein said reading means is adapted to determine a block to be synthesized by said synthesizer means and to obtain the address of the determined block.

3. An image processing apparatus according to claim 1, wherein said memory means is adapted to store encoded data obtained by vector encoding.

4. An image processing apparatus according to claim 1, wherein said supply means is adapted to supply vector data representing the second image.

5. An image processing method of editing a first image represented by encoded data stored in a memory, the encoded data being obtained by dividing the image into a plurality of blocks and by encoding image data of each of the plurality of blocks, comprising the step of:

generating area data representing an image portion of a first image in which a second image is to be inserted, the image portion being a part of the first image;

obtaining an address corresponding to each of a plurality of blocks included in the image portion of the first image in which the second image is to be inserted;

reading out the encoded data indicated by the thus obtained address from the memory on a block basis;

decoding the encoded data read out from the memory on a block basis to decoded image data on a block basis;

supplying code data corresponding to the second image;

developing the code data into second image data representing the second image;

synthesizing the decoded image data with the second image data to insert the second image in the first image on a block basis;

encoding the synthesized image data on a block basis to produce re-encoded data; and writing the re-encoded data in the memory, wherein the encoded data which are not read out from the memory remain in the memory and, together with the re-encoded data, represent a synthesized image of the first and second image.

6. An image processing method according to claim 5, wherein the encoded data is obtained by means of vector encoding.

7. An image processing method according to claim 5, wherein in said supplying step, vector data representing the second image is supplied.

8. An apparatus according to claim 1, wherein said code data is graphic data.

9. An apparatus according to claim 1, wherein said code data represent a character.

10. An apparatus according to claim 1, wherein said code data is described in a page description language.

11. A method according to claim 5, wherein said code data is graphic data.

12. A method according to claim 5, wherein said code data represents a character.

13. A method according to claim 5, wherein said code data is described in a page description language.

14. An image processing apparatus comprising:

memory means for storing encoded data obtained by dividing a first image into a plurality of blocks, each of said plurality of blocks being a predetermined size, and by encoding image data of each of said plurality of blocks;

generating means for generating positional information representing an image portion of the first image into which a second image is to be edited, the image portion being a part of the first image, and the second image being different from the first image and intended to be used for editing of the first image;

supplying means for supplying code data corresponding to the second image to be edited in the image portion of the first image;

developing means for developing the code data into image data representing the second image;

reading means for reading out the encoded data of a block included in the image portion of the first image in which the second image is to be edited, from said memory means based on the positional information;

decoding means for decoding the encoded data read out from said memory means on a block basis to decoded image data on a block basis;

editing means for editing the decoded image data from said decoding means with the image data of a corresponding block in the second image;

encoding means for encoding the image data edited by said editing means on a block basis to produce re-encoded data; and writing means for writing the re-encoded data in said memory means.

15. An image processing apparatus according to claim 14, wherein said memory means is adapted to store encoded data obtained by vector encoding.

16. An image processing apparatus according to claim 14, wherein said supply means is adapted to supply vector data.

17. An apparatus according to claim 14, wherein said code data is graphic data.

18. An apparatus according to claim 14, wherein said code data represents a character.

19. An apparatus according to claim 14, wherein said code data is described in a page description language.

20. An image processing method of editing a first image represented by encoded data stored in a memory, the encoded data being obtained by dividing the image into a plurality of blocks and by encoding image data of each of the plurality of blocks, comprising the steps of:

generating positional information representing an image portion of a first image into which a second image is to be edited, the image portion being a part of the first image, and the second image being different from the first image and intended to be used for editing of the first image;

reading out the encoded data of a block included in the image portion of the first image in which the second image is to be edited, from the memory based on the positional information;

decoding the encoded data read out from the memory and generating decoded image data;

supplying code data corresponding to the second image;

developing the code data into second image data representing the second image;

editing the decoded image data with the second image data of a corresponding block in the second image; and encoding the edited image data on a block basis to produce re-encoded data; and writing the re-encoded data in the memory.

21. A method according to claim 20, wherein said code data is graphic data.

22. A method according to claim 20, wherein said code data represents a character.

23. A method according to claim 20, wherein said code data is described in a page description language.

24. An image processing method according to claim 20, wherein the encoded data obtained by means of vector encoding.

25. An image method according to claim 20, wherein in said supplying step, vector representing the second image is supplied.

* * * * *

UNITED STATES PATENT AND TRADEMARK OFFICE
CERTIFICATE OF CORRECTION

PATENT NO. : 5,638,464

DATED : June 10, 1997

INVENTOR : NAOTO KAWAMURA

Page 1 of 3

It is certified that error appears in the above-identified patent and that said Letters Patent is hereby corrected as shown below:

IN THE DRAWINGS

Sheet 3, FIG. 4 "IMAG" should read --IMAGE--.

COLUMN 1

Line 24,   "and" should read --an--;
  Line 35,   "a" should be deleted--.

COLUMN 2

Line 29,   "affin" should read --affine--;
  Line 42,   "editing the" should read --editing--;
  Line 61,   "date" should be deleted.

COLUMN 3

Line 12,   "on" should read --on an--;
  Line 21,   "drawings. Explanation" should read --drawings. ¶ Explanation--;
  Line 46,   "on" should read --in--.

UNITED STATES PATENT AND TRADEMARK OFFICE
CERTIFICATE OF CORRECTION

PATENT NO. : 5,638,464

DATED : June 10, 1997

INVENTOR : NAOTO KAWAMURA

It is certified that error appears in the above-identified patent and that said Letters Patent is hereby corrected as shown below:

COLUMN 5

Line 8,   "manner. Explana-" should read --manner.
                ¶ Explana- --;
   Line 27,  "designation" should read --designation.--.

COLUMN 6

Line 46,  "[ ] the" should read --[ ] is the--;
   Line 50,  "A" should read --At-- and "data," should read
                --data--.

COLUMN 8

Line 43,  "step" should read --steps--.

COLUMN 9

Line 10,  "represent" should read --represents--.

UNITED STATES PATENT AND TRADEMARK OFFICE
CERTIFICATE OF CORRECTION

PATENT NO. : 5,638,464

DATED : June 10, 1997

INVENTOR : NAOTO KAWAMURA

It is certified that error appears in the above-identified patent and that said Letters Patent is hereby corrected as shown below:

COLUMN 10

Line 45, "obtained" should read --is obtained--;
Line 47, "method" should read --processing method--.

Signed and Sealed this

Tenth Day of February, 1998

Attest:

BRUCE LEHMAN

Attesting Officer    Commissioner of Patents and Trademarks